No. 624,244. Patented May 2, 1899.
J. S. POYEN.
ELLIPTIC SPRING.
(Application filed Apr. 11, 1898.)
(No Model.)
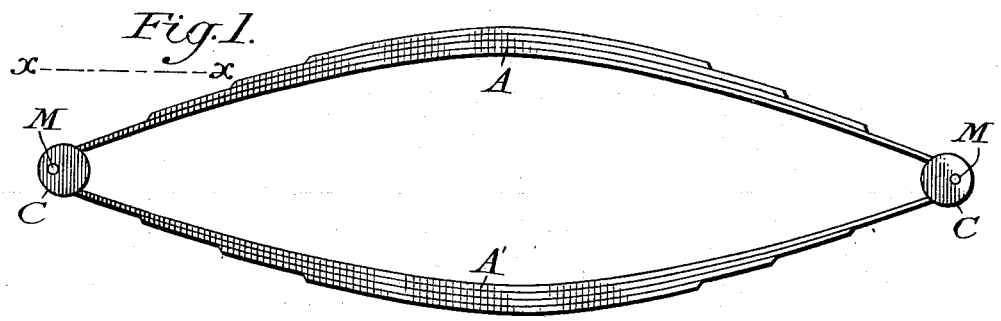
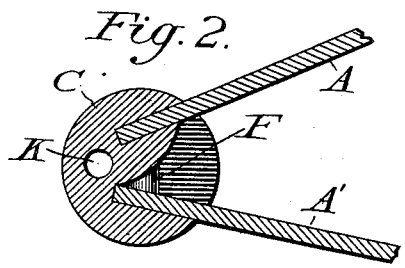 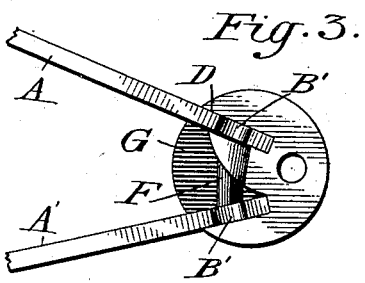
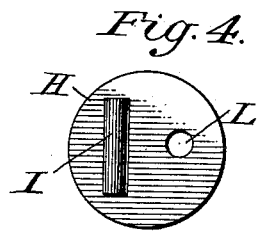 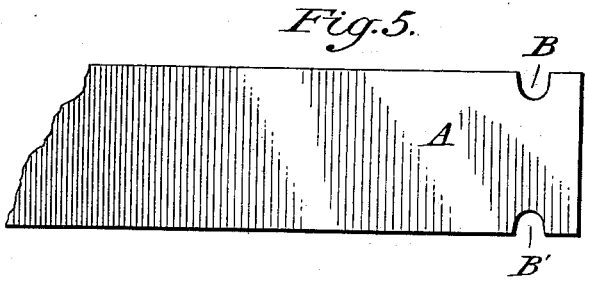
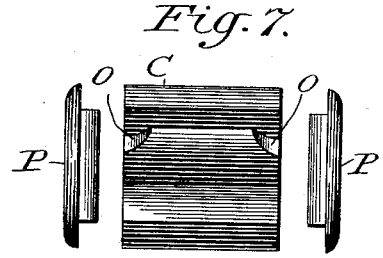 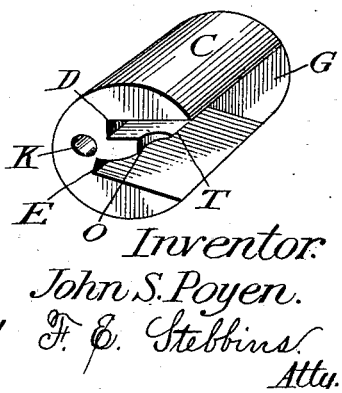
Witnesses:
D. W. Edelin
Clifford K. Berryman
Inventor:
John S. Poyen.
by F. E. Stebbins
Atty.

UNITED STATES PATENT OFFICE.

JOHN S. POYEN, OF AMESBURY, MASSACHUSETTS.

ELLIPTIC SPRING.

SPECIFICATION forming part of Letters Patent No. 624,244, dated May 2, 1899.

Application filed April 11, 1898. Serial No. 677,159. (No model.)

*To all whom it may concern:*

Be it known that I, JOHN S. POYEN, a citizen of the United States, and a resident of Amesbury, county of Essex, State of Massachusetts, have invented certain new and useful Improvements in Elliptic Springs, of which the following, taken in connection with the accompanying drawings, is a specification sufficiently full, clear, and accurate to enable persons skilled in the art to make and use the same.

My improvements relate to elliptic springs, and in particular to the master-leaves and the clips which unite the leaves at the ends.

The object of my invention is the production of a spring in which the ends of the master-leaves will not be weakened by forging or by being bent into a ring, which is more simple in construction than any heretofore produced, which is cheap in first cost and easy to repair, which is strong and durable, and which utilizes the elasticity of at least one master-leaf to the extreme ends.

With the above purpose in view my invention consists in providing double-slotted clips, each open at one or both ends, inserting the ends of the master-leaves within the slots, and securing the same in position by a cap or caps.

It further consists in the combination, with the ends of the master-leaves, of slotted clips which hold the ends of one leaf practically immovable and allow movement of the ends of the other leaf.

Further, it consists in the combination, with the straight unbent ends of the master-leaves, of slotted clips which hold the ends of one leaf practically immovable, but allow movement of the ends of the other leaf, and means for preventing the longitudinal displacement of the movable leaf.

Still further, it consists in the combination, with the ends of the master-leaves, of clips or socket-pieces, means which hold the ends of one leaf practically immovable, the other leaf being movable, and means for preventing the longitudinal displacement of the movable leaf.

Still further, it consists in the combination, with slotted clips, of master-leaves notched at the ends.

Finally, it consists in certain novelties in construction and combinations of parts hereinafter set forth and claimed.

The illustrations on the drawings show one example of the physical embodiment of my invention and one modification of the clip.

Figure 1 is a side view of an elliptic spring embodying my improvements. Fig. 2 is an enlarged sectional view of the clip and master-leaves, taken on line $x\,x$, Fig. 1. Fig. 3 is a side view of one end of the spring shown in Fig. 1, with an end cap removed. Fig. 4 is a view of the inside surface of a cap. Fig. 5 shows the end of a master-leaf provided with notches. Fig. 6 is a view in perspective of a clip with the cap removed. Fig. 7 illustrates a modified form of the clip, in which each end is provided with a removable cap.

Referring to the figures of the drawings, A A' are the master-leaves of an elliptic spring, provided with substantially straight and plane ends of uniform thickness and having parts of the metal removed or upset to form notches B B'. The ends of the master-leaves are united and held in place through the medium of metallic clips, (designated by C.) Each clip is fashioned in such a way as to form two slots D and E, the former adapted to receive and rigidly hold the end of one leaf so it cannot move appreciably relative to the clip and the latter of substantially the shape illustrated and adapted to hold the end of the other leaf so that it can move about the axis of the clip.

F is a projecting mass of metal or lug on the inner surface of the end G of the clip, which engages a notch B in a leaf.

H is a removable cap provided with a lug I, adapted to engage a notch B' of a leaf and a recess O in the wall T of a clip. Through the body of the clip and cap are respectively made holes K and L for receiving a rivet M. For the elements F and I may be substituted equivalents for performing the desired functions.

To assemble the master spring-leaves and clips, the notched ends of the upper leaf are inserted sidewise into the slots D far enough to allow the notches B to engage the projecting lugs F. The lower leaf is adjusted in the same way. Then the caps H are placed over the open ends, the lugs I matching the notches B' and recesses O, and finally the rivet M is passed through holes K L and upset.

In Fig. 7 I have shown a modified construction of the clip, in which removable caps P P are provided for the ends; but the type having one removable cap may be preferable in practice. However, in some cases I may use a clip with one or two slots, closed at both ends, and substitute an equivalent or equivalents for elements F and I to retain the master-leaves.

It will be seen from the foregoing that I have produced by my method of construction a spring which fulfils all the conditions hereinbefore set forth as the object of my invention. However, I do not wish to limit the scope of the same to the exact details of shape or construction or mode of operation as disclosed in this particular example, inasmuch as many changes may be introduced without constituting a substantial departure.

What I claim as new, and desire to secure by Letters Patent, is—

1. A carriage-spring having master-leaves to the opposite ends of one of which are rigidly and immovably secured clips or socket-pieces, the opposite ends of the other master-leaf loosely and movably fitting within slots formed in the said clips, and means for preventing the longitudinal displacement of said latter master-leaf.

2. An elliptic spring having master-leaves with straight unbent ends fitting within slots formed in clips or socket-pieces, the ends of one leaf immovable relative to the clips or socket-pieces and the ends of the other leaf movable, and means for preventing the longitudinal displacement of the movable leaf.

3. The combination in a spring, and with the adjacent ends of the master-leaves, of a clip having two slots closed at the bottoms, each slot receiving the end of a master-leaf, and means independent of the opposite end of the spring for holding the clip and ends of the master-leaves in position, in substance as set forth.

4. The combination in a spring of the master-leaves and clips, the ends of the master-leaves each having a notch engaging a raised lug on a clip; substantially as described.

5. The combination in a spring of slotted clips, and master-leaves having notches engaging lugs on the clips, and caps; in substance as set forth.

6. The combination in a spring of slotted clips, master-leaves each having a notch, and a removable cap having a lug; in substance as set forth.

7. The combination in a spring of clips each having two closed slots open at one side, master-leaves fitting the slots, and a cap; substantially as described.

8. The combination in a spring of clips each having two slots, master-leaves, and means for holding the leaves in position; the ends of one of said master-leaves being movable in the slots, and the ends of the other leaf substantially immovable; in substance as set forth.

9. The combination with the notched master-leaves of a spring and the clips having slots D and E, of caps provided with lugs I engaging the notches, one of the said slots being wider than the other; in substance as set forth.

10. A metallic clip for receiving the ends of the master-leaves of a spring, said clip having two closed slots; a cap adapted to hold the leaves against displacement; and means for securing the cap to the clip; in substance as and for the purposes set forth.

JOHN S. POYEN.

Witnesses:
CLARENCE S. MORSE,
FRANK R. WHITCHER.